United States Patent [19]

Hsieh

[11] Patent Number: 4,542,072

[45] Date of Patent: Sep. 17, 1985

[54] PROCESSING SILICON NITRIDE BY USE OF BORON NITRIDE AS A BARRIER LAYER

[75] Inventor: Martin Y. Hsieh, Palo Alto, Calif.

[73] Assignee: GTE Products Corporation, Stamford, Conn.

[21] Appl. No.: 608,598

[22] Filed: May 9, 1984

[51] Int. Cl.$^4$ ............................ C09J 1/00; B32B 9/04
[52] U.S. Cl. ..................................... 428/446; 156/89; 428/688; 428/689; 428/698
[58] Field of Search ............... 428/446, 688, 689, 698; 156/89

[56] References Cited

U.S. PATENT DOCUMENTS 4,447,283  5/1984  Ebata et al. ........................ 428/689
4,485,143  11/1984  Inoue et al. ........................ 428/446

Primary Examiner—William J. Van Balen
Attorney, Agent, or Firm—Donald R. Castle

[57] ABSTRACT

A process is disclosed for producing a ceramic body coated with boron nitride. A green ceramic body is coated with boron nitride and sintered at a temperature and for a time sufficient for the body to achieve near theoretical density.

Ceramic bodies of near theoretical density can be produced without deformation by coating the bodies with boron nitride, assembling the bodies with a supporting ceramic member which is also coated with boron nitride, sintering the assembly at a temperature and for a time for the bodies to achieve near theoretical density without deformation.

8 Claims, 2 Drawing Figures

PROCESSING SILICON NITRIDE BY USE OF BORON NITRIDE AS A BARRIER LAYER

BACKGROUND OF THE INVENTION

This invention relates to a method of using a boron nitride composition as a coating in fabrication of ceramic parts normally difficult to produce due to thin walls or complex shapes.

The properties of silicon nitride and silicon nitride-based materials such as high strength, wear resistance, high decomposition temperatures, oxidation resistance, excellent thermal shock properties, and resistance to corrosive environments make them ideal candidates for certain parts as engine components. One major difficulty, however, is in fabricating suitable shapes with these desirable properties. Although it has been shown that, with suitable additives, silicon nitride can be sintered to reasonably high density, the technique has not yet been developed to the point of wide application, and the mechanical properties of the sintered products deteriorate at high temperatures.

SUMMARY OF THE INVENTION

Ceramic bodies of near theoretical density can be produced without deformation by coating the bodies with boron nitride, assembling the bodies with a supporting ceramic member which is also coated with boron nitride, sintering the assembly at a temperature and for a time for the bodies to achieve near theoretical density without deformation.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

This invention relates to a process for using boron nitride, as a coating, in fabrication of ceramic parts. More particularly, it relates to a process for producing ceramic bodies of near theorectical density without deformation by coating the ceramic bodies with boron nitride near to sintering.

The ceramic material for the parts can be silicon nitride or sialon. The ceramic material can contain sintering aids such as yttrium oxide, aluminum oxide, lanthanum oxide, magnesium oxide and mixtures thereof. Preferred ceramic compositions are, by weight: (a) from about 0.5% to about 4% aluminum oxide, from about 2% to about 14% yttrium oxide, and the balance silicon nitride, and (b) from about 0.5% to about 5% aluminum oxide, from about 2% to about 15% lanthanum oxide and the balance silicon nitride. The ceramic parts can be formed by any conventional process such as by low pressure sintering or isostatic pressing.

The boron nitride composition can consist essentially of boron nitride powder, ammonium citrate, water, and a binder. The binder can be a water dispersible alkyd resin, polyvinyl alcohol, or poly glycols. The preferred binder is a water dispersible alkyd resin.

Ceramic bodies of near theoretical density can be produced without deformation by a process which involves forming a green ceramic body or bodies that deform during sintering if unsupported, forming at least one ceramic member suitable for providing support to the green body or bodies, coating the body or bodies and member with boron nitride, assembling the body or bodies and member wherein the member provides support to the body or bodies, sintering the resulting assembly at a temperature and for a time sufficient for the body or bodies to achieve near theoretical density. Sintering temperatures are generally from about 1600° C. to about 1800° C. with from about 1740° C. to about 1780° C. being preferred. Sintering times are generally from about 1 hour to about 24 hours with from about 2 hours to about 8 hours being preferred. The resulting ceramic article has a composition as given previously with a coating of boron nitride of from about 0.5 to about 10 mils with from about 1 to about 6 mils being preferred, the coating being uniformly distributed over the surface of the article.

To more fully illustrate this invention, the following non-limiting examples are presented. All parts, portions and percentage are by weight unless otherwise stated.

EXAMPLE 1

Figure 1:
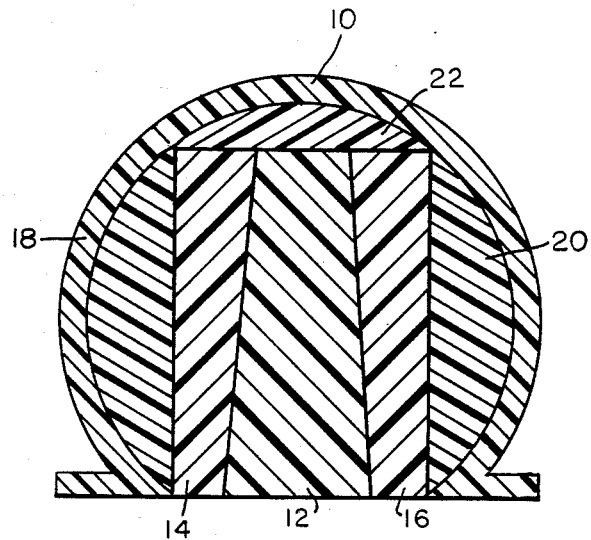
FIG. 1 is a cross sectional view illustrating the concept of using boron nitride barrier layer(s).

FIG. 1 is given for the purpose of illustrating the concept of using a boron nitride barrier layer(s) in the silicon nitride process. Green part 10 is made from silicon nitride by conventional methods. The core consisting of parts 12, 14, 16, 18, 20 and 22 is used to prevent the deformation of part 10. Parts 12, 14, 16, 18, 20 and 22 are preferably made from the same material and the same process temporary organic binder enables the green ceramic parts to be machined. The machined parts are coated with thin layers of the boron nitride composition as the inert barrier layer. The parts are bound together by the temporary organic binder in the boron nitride coating. After drying, the combined core (parts 12 through 22) can be used as a mandrel or mold for isopressing can be done at pressures higher than the initial pressure applied to the core such that a uniform homogeneous green density can be achieved for both the desired part 10 and the parts 12 through 22 of the core. Part 10 with parts 12 through 22 of the core can be further cured and machined to the desirable dimensions. The combined parts can be sintered according to a conventional method.

EXAMPLE 2

Figure 2:
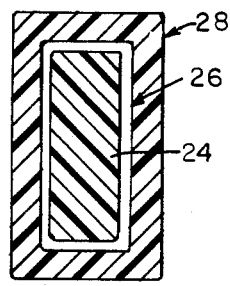
FIG. 2 is another cross sectional view using boron nitride as a slip coating.

FIG. 2 depicts another aspect of the invention. Part 24 is an isostatically pressed silicon nitride body. Part 26 is a boron nitride layer applied by slip coating. Part 28 is a silicon nitride layer produced by slip coating. The green density of layer 28 can be predetermined. Part 24 is isostatically pressed to match the green density of part 28. Binders are cured and the outer part of 28 is matched to desired dimensions. The binder is burned out of parts 24, 26, and 28. Parts 24, 26, and 28 are reisostatically pressed at higher pressures to ensure homogeneous green densities. This pressure is determined by the final desired dimensions.

EXAMPLE 3

Two silicon nitride bodies made from silicon nitride having a composition of about 2% alumina, about 13% yttrium oxide, and about 85% silicon nitride can be removed from each other without sticking, where a thin layer of boron nitride is coated between the two bodies.

EXAMPLE 4

Coated silicon nitride bodies embedded in boron nitride powder during sintering show equally good properties as the standard embedded process. Data is given below.

| Sample No. | Composition (% by weight) | No Coating (Sample Embedded In Own Composition) | | Coated With BN And Embedded In BN | |
|---|---|---|---|---|---|
| | | Density (g/cc) | Rockwell 45N Hardness | Density (g/cc) | Rockwell 45N Hardness |
| 1 | 2% alumina, 13% yttrium oxide, 85% silicon nitride | 3.285 | 81.8 | 3.280 | 80.9 |
| 2 | 4% alumina, 12% lanthanium oxide, 84% silicon nitride | 3.2961 | 85.4 | 3.304 | 85.18 |

Results indicate that boron nitride can be used as an inert barrier layer during sintering silicon nitride parts while maintaining desirable properties of the parts.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process suitable for preventing the deformation of ceramic bodies said process comprising:
   (a) forming a green ceramic body having a portion that during sintering deforms if unsupported,
   (b) forming at least one ceramic member suitable for providing support to said portion,
   (c) coating said body and said member with boron nitride,
   (d) assembling said body and said member whereby said member provides support for said portion and
   (e) sintering the resulting assembly at a temperature for said body to achieve near theoretical density.

2. An article consisting essentially of body consisting essentially of from about 80% to about 97.5% by weight of silicon nitride and from about 2.5% to about 20% of a sintering aid selected from the group consisting of yttrium oxide, aluminum oxide, magnesium oxide, lanthanum oxide and mixtures thereof and a coating having a thickness of from 0.5 to about 10 mils of boron nitride relatively uniformly distributed over the surface of said body.

3. A process for producing a ceramic body coated with a boron nitride coating composition comprising coating a green ceramic body with boron nitride and sintering said green ceramic body at a temperature and for a time sufficient for said body to achieve near theoretical density.

4. A process according to claim 1 wherein the ceramic body is made from material selected from the group consisting of silicon nitride and sialon.

5. A process according to claim 1 wherein the ceramic body material contains sintering aids selected from the group consisting of yttrium oxide, aluminum oxide, and lanthanum oxide.

6. A process according to claim 1 wherein the ceramic material consists essentialy of by weight: (a) from about 0.5% to about 4% aluminum oxide, from about 2% to about 14% yttrium oxide and the balance silicon nitride and (b) from about 0.5% to about 5% aluminum oxide, from about 2% to about 15% lanthanum oxide, and the balance silcion nitride.

7. An article according to claim 2 consisting essentially of a body consisting essentially of by weight: (a) from about 0.5% to about 4% aluminum oxide, from about 2% to about 14% yttrium oxide and the balance silicon nitride, and (b) from about 0.5% to about 5% aluminum oxide, from about 2% to about 15% lanthanum oxide, and the balance silicon nitride.

8. A process according to claim 3 wherein the boron nitride coating composition consists essentially of boron nitride powder, ammonium citrate, water, and a binder selected from the group consisting of a water dipsersible alkyd resins, polyvinyl alcohol, polyurethane, polyglycols and mixtures thereof.

* * * * *